(12) United States Patent
Mukai et al.

(10) Patent No.: US 10,294,568 B2
(45) Date of Patent: *May 21, 2019

(54) METAL PLATE COATED STAINLESS MATERIAL AND METHOD OF PRODUCING METAL PLATE COATED STAINLESS MATERIAL

(71) Applicant: Toyo Kohan Co., Ltd., Tokyo (JP)

(72) Inventors: Nobuaki Mukai, Yamaguchi (JP); Takahiro Yoshida, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 311 days.

This patent is subject to a terminal disclaimer.

(21) Appl. No.: 15/023,323

(22) PCT Filed: Sep. 11, 2014

(86) PCT No.: PCT/JP2014/074053
§ 371 (c)(1),
(2) Date: Aug. 2, 2016

(87) PCT Pub. No.: WO2015/041132
PCT Pub. Date: Mar. 26, 2015

(65) Prior Publication Data
US 2016/0340786 A1     Nov. 24, 2016

(30) Foreign Application Priority Data

Sep. 20, 2013   (JP) ................................ 2013-195796
Sep. 20, 2013   (JP) ................................ 2013-195801

(51) Int. Cl.
*B32B 9/00*     (2006.01)
*C23C 18/18*    (2006.01)
(Continued)

(52) U.S. Cl.
CPC ........ *C23C 18/1827* (2013.01); *B32B 15/013* (2013.01); *B32B 15/018* (2013.01);
(Continued)

(58) Field of Classification Search
None
See application file for complete search history.

(56) References Cited

U.S. PATENT DOCUMENTS 5,275,696 A     1/1994   Gaskin et al.
10,000,038 B2*  6/2018   Mukai .................... C23C 18/50
(Continued)

FOREIGN PATENT DOCUMENTS

CN   102239593 A   11/2011
EP   3 009 530 A1   4/2016
(Continued)

OTHER PUBLICATIONS

A European Search Report from corresponding EP 14 84 6487 dated May 2, 2017; 9 pgs.
(Continued)

*Primary Examiner* — Seth Dumbris
(74) *Attorney, Agent, or Firm* — Muncy, Geissler, Olds & Lowe, P.C.

(57) ABSTRACT

There is provided a metal plate coated stainless material (100) which includes a stainless steel sheet (10) having formed thereon a passivation film (11) having a Cr/O value in the range of 0.05 to 0.2 and a Cr/Fe value in the range of 0.5 to 0.8 at the surface as measured by an Auger electron spectroscopy analysis and a metal plated layer (20) formed on the passivation film (11) of the stainless steel sheet (10), in which the metal plated layer (20) is a plated layer formed from any one metal selected from among Ag, Pd, Pt, Rh, Ru, Cu, Sn and Cr, or an alloy of these metals.

7 Claims, 20 Drawing Sheets

(51) Int. Cl.
  *C23C 18/42* (2006.01)
  *C23C 22/50* (2006.01)
  *C23C 28/00* (2006.01)
  *B32B 15/01* (2006.01)
  *C23C 18/31* (2006.01)
  *C23C 18/38* (2006.01)
  *C25D 3/46* (2006.01)
  *C23C 18/48* (2006.01)

(52) U.S. Cl.
  CPC .......... *C23C 18/1834* (2013.01); *C23C 18/31* (2013.01); *C23C 18/38* (2013.01); *C23C 18/42* (2013.01); *C23C 18/48* (2013.01); *C23C 22/50* (2013.01); *C23C 28/322* (2013.01); *C23C 28/34* (2013.01); *C25D 3/46* (2013.01)

(56) References Cited

U.S. PATENT DOCUMENTS

| | | | |
|---|---|---|---|
| 2005/0142416 A1* | 6/2005 | Takai | H01M 8/021 429/434 |
| 2006/0159971 A1 | 7/2006 | Takagi et al. | |
| 2010/0035115 A1 | 2/2010 | Takagi et al. | |
| 2011/0250522 A1 | 10/2011 | Kaminaka et al. | |
| 2011/0287336 A1* | 11/2011 | Himeno | H01M 8/0213 429/492 |
| 2013/0071688 A1 | 2/2013 | Bessho | |

FOREIGN PATENT DOCUMENTS

| | | |
|---|---|---|
| JP | 63-282292 | 11/1988 |
| JP | 09-217166 | 8/1997 |
| JP | 2001-011655 | 1/2001 |
| JP | 2002-124267 | 4/2002 |
| JP | 2008-004498 | 1/2008 |
| JP | 2010-138487 | 6/2010 |
| JP | 2010-0236091 | 10/2010 |

OTHER PUBLICATIONS

Office Action dated Mar. 8, 2017 in corresponding CN Application No. 201480051793.8, with English translation, 15 pages.
An Office Action issued in corresponding JP Application No. 2015-537885 dated Jul. 31, 2018.

* cited by examiner (C) Cr2p (D) O1s (A) EXAMPLE 2
(IMMERSED FOR 10 SECONDS)

(B) COMPARATIVE EXAMPLE 2
(IMMERSED FOR 60 SECONDS)

(C) SUS316L (UNTREATED)

(A) EXAMPLE 2
(IMMERSED FOR 10 SECONDS)

(B) COMPARATIVE EXAMPLE 2
(IMMERSED FOR 60 SECONDS)

AMORPHOUS Ni OXIDE OR MICROCRYSTALLINE Ni OXIDE (C) SUS316L (UNTREATED)

(A) BEFORE FORMATION OF
METAL PLATED LAYER 20

(B) EXAMPLE 3
(AFTER FORMATION OF SILVER PLATED LAYER)

(C) EXAMPLE 3
(PALLADIUM PLATED LAYER)

(D) EXAMPLE 3
(PLATINUM PLATED LAYER)

METAL PLATE COATED STAINLESS MATERIAL AND METHOD OF PRODUCING METAL PLATE COATED STAINLESS MATERIAL

BACKGROUND OF THE INVENTION

1. Technical Field of the Invention

The present invention relates to a metal plate coated stainless material, and a method of producing a metal plate coated stainless material.

2. Description of the Related Art

Conventionally, as an electrical contact material used in connectors, switches, printed wiring boards and the like, a metal plate coated stainless material in which the surface of a stainless steel sheet is coated with a metal plated layer formed from any one metal among Ag, Pd, Pt, Rh, Ru, Cu, Sn and Cr, or an alloy composed of at least two or more of these metals, has been used.

Usually, in such a metal plate coated stainless material formed with a metal plated layer at the surface, an underlying nickel plating is performed to form an underlying nickel plated layer on the stainless steel sheet before forming the metal plated layer, in order to improve the interfacial adhesion property of the metal plated layer at the surface. In this case, when the metal plated layer is formed on such an underlying nickel plated layer, if defects such as pinholes occur in the metal plated layer, nickel will dissolve from the underlying nickel plated layer thereby to cause delamination of the metal plated layer, which may be problematic.

To overcome this problem, for example, Patent Document 1 discloses a technique of forming a gold plated layer directly on a stainless steel sheet without performing such underlying nickel plating.

PRIOR ART DOCUMENT

Patent Document

Patent Document 1: Japanese Patent Application Publication No. 2008-4498

SUMMARY OF THE INVENTION

According to the above technique as disclosed in Patent Document 1, however, problems may arise in that, if the thickness of the gold plated layer at the surface is unduly thin, the coverage of the gold plated layer will be significantly reduced thereby to deteriorate the interfacial adhesion property of the gold plated layer, and the stainless steel sheet will be exposed to readily corrode, while on the other hand an unduly thick thickness of the gold plated layer at the surface will lead to disadvantages in cost.

The present invention has been made in consideration of such actual circumstances, and an object of the present invention is to provide a gold plate coated stainless material which can be improved in the coverage and interfacial adhesion property of the gold plated layer even when reducing the thickness of the gold plated layer at the surface, thereby to be excellent in corrosion resistance and conductivity and advantageous in cost.

Means for Solving Problems

The present inventors conducted a thorough investigation in order to achieve the object described above, and as a result, the present inventors found that the object can be achieved by forming a predetermined passivation film on a stainless steel sheet and forming a metal plated layer on the passivation film. Thus, the present inventors completed the invention.

That is, according to the invention, there is provided a metal plate coated stainless material including a stainless steel sheet having a passivation film formed thereon, the passivation film having a Cr/O value in the range of 0.05 to 0.2 and a Cr/Fe value in the range of 0.5 to 0.8 at the surface as measured by an Auger electron spectroscopy analysis; and a metal plated layer formed from any one metal selected from among Ag, Pd, Pt, Rh, Ru, Cu, Sn and Cr, or at least two or more metals selected from among these.

It is preferable that the metal plate coated stainless material of the invention has a coverage of the metal plated layer of 95% or more.

According to the invention, there is provided a method for producing a metal plate coated stainless material, the method including an immersion step of immersing a stainless steel sheet in an aqueous solution of sulfuric acid; and a plating step of forming, on the stainless steel sheet, a metal plated layer formed from any one metal selected from among Ag, Pd, Pt, Rh, Ru, Cu, Sn and Cr, or an alloy composed of at least two or more metals selected from among these metals. In the immersion step, the sulfuric acid concentration of the aqueous solution of sulfuric acid used when the stainless steel sheet is immersed in the aqueous solution of sulfuric acid is designated as x [vol %] (provided that 20≤x≤25), the temperature is designated as y [° C.], and the immersion time is designated as z [seconds], the following Expression (1) is satisfied:

$$0.6 \times 10^6 \leq x^2 \cdot (y-40)^2 \cdot \sqrt{z} \leq 3.0 \times 10^6 \quad (1)$$

According to the invention, there is provided a method for producing a metal plate coated stainless material, the method including an immersion step of immersing a stainless steel sheet in an aqueous solution of sulfuric acid, and thereby forming, on the stainless steel sheet, a passivation film having a Cr/O value in the range of 0.05 to 0.2 and a Cr/Fe value in the range of 0.5 to 0.8 at the surface as measured by an Auger electron spectroscopy analysis; and a plating step of forming, on the passivation film of the stainless steel sheet, a metal plated layer composed of any one metal selected from among Ag, Pd, Pt, Rh, Ru, Cu, Sn and Cr, or an alloy composed of at least two or more metals selected from among these metals.

According to the invention, in regard to a metal plated layer formed on a stainless steel sheet, even if the thickness is reduced, the coverage and adhesiveness of the metal plated layer can be enhanced. Thereby, a metal plate coated stainless material which has excellent corrosion resistance and electrical conductivity and is advantageous in terms of cost can be provided.

DESCRIPTION OF THE PREFERRED EMBODIMENT

Hereinafter, the metal plate coated stainless material 100 of the present embodiment will be explained.

Figure 1:
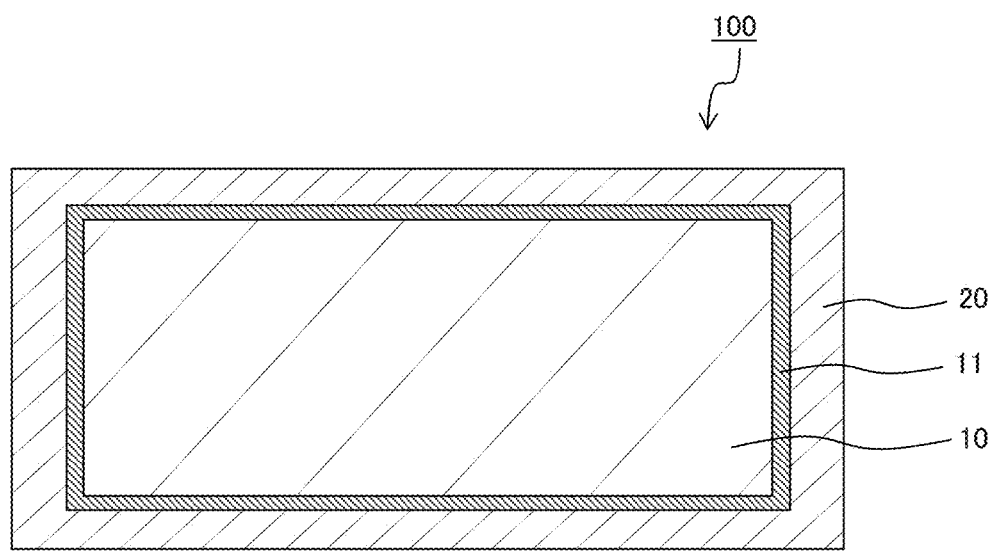
FIG. 1 is a configuration diagram of a metal plate coated stainless material 100 related to an embodiment of the invention.

The metal plate coated stainless material 100 of the present embodiment is configured such that, as illustrated in FIG. 1, a metal plated layer 20 formed from any one metal selected from among Ag, Pd, Pt, Rh, Ru, Cu, Sn and Cr, or an alloy composed of at least two or more metals selected from among these metals, is formed on a stainless steel sheet 10 on which a passivation film 11 is formed, characterized in that the passivation film 11 of the stainless steel sheet 10 has a Cr/O value in the range of 0.05 to 0.2 and a Cr/Fe value in the range of 0.5 to 0.8 at the surface as measured by an Auger electron spectroscopy analysis.

<Stainless Steel Sheet 10>

The stainless steel sheet 10 to be a substrate of the metal plate coated stainless material 100 according to the present embodiment is not particularly limited. Examples of the stainless steel sheet 10 include those made of stainless steel material, such as SUS316, SUS316L and SUS304. Various types of stainless steel sheets may be mentioned, such as martensite-based, ferrite-based and austenite-based ones, among which austenite-based stainless steel sheets may be preferred. The shape and form of the stainless steel sheet 10 are not particularly limited, and may be appropriately selected depending on the use. For example, the stainless steel sheet 10 may be used after being worked into a necessary shape or form depending on its use, such as a conductive metal component worked into a linear form or a plate or sheet-like form, a conductive member obtained by working a plate or sheet into an irregular form, and an electronic device component worked into a spring-like or tubular form. The thickness (such as diameter and sheet or plate thickness) of the stainless steel sheet 10 is also not particularly limited, and may be appropriately selected depending on the use.

As shown in FIG. 1, the stainless steel sheet 10 is formed with the passivation film 11 at the surface. When measured by Auger electron spectroscopy analysis, the surface of the passivation film 11 has a certain Cr/O value (molar ratio of Cr/O) and a certain Cr/Fe value (molar ratio of Cr/Fe), which range as follows. That is, the Cr/O value is within a range of 0.05 to 0.2 and may preferably be within a range of 0.05 to 0.15. The Cr/Fe value is within a range of 0.5 to 0.8 and may preferably be within a range of 0.5 to 0.7.

According to the feature of the present embodiment that the Cr/O value and Cr/Fe value when measured by Auger electron spectroscopy analysis are controlled within the above ranges on the surface of the passivation film 11 formed with the stainless steel sheet 10, the metal plated layer 20 to be formed on the passivation film 11 can have an improved coverage (ratio of an area covered by the metal plated layer 20 to the surface of the passivation film 11 on which the metal plated layer 20 is formed) and an excellent interfacial adhesion property.

In the present embodiment, the Cr/O value and Cr/Fe value can be measured by Auger electron spectroscopy analysis using the method below. First, a scanning-type Auger electron spectroscopy analyzer (AES) is used to measure the surface of the passivation film 11, and the atomic percentages of Cr, O, and Fe at the surface of the passivation film 11 are calculated. Five locations at the surface of the passivation film 11 are measured using a scanning-type Auger electron spectroscopy analyzer, and the obtained results may be averaged thereby to calculate the Cr/O value (at % of Cr/at % of O) and the Cr/Fe value (at % of Cr/at % of Fe). Among the obtained peaks by the measurement using a scanning-type Auger electron spectroscopy analyzer in the present embodiment, a peak given at 510 to 535 eV represents the peak of Cr, a peak given at 485 to 520 eV represents the peak of O, and a peak given at 570 to 600 eV represents the peak of Fe. The atomic percentages of Cr, O, and Fe are to be measured when the sum of Cr, O, and Fe is 100 at %.

In the present embodiment, the method of forming the passivation film 11 at the surface of the stainless steel sheet 10 is not particularly limited. Examples of the method include a method of immersing a stainless steel material, such as SUS316L as described above, which constitutes the stainless steel sheet 10, into a sulfuric acid aqueous solution.

When a stainless steel material is immersed in a sulfuric acid aqueous solution to form the passivation film 11, the sulfuric acid concentration in the sulfuric acid aqueous solution may preferably be 20 to 25 vol %. The temperature when immersing the stainless steel material may preferably be 50° C. to 70° C., and more preferably 60° C. to 70° C. The time for the stainless steel material to be immersed in the sulfuric acid aqueous solution may preferably be 5 to 600 seconds, and more preferably 5 to 300 seconds.

In particular, in the present embodiment, when a stainless steel sheet is immersed in a sulfuric acid aqueous solution having a sulfuric acid concentration x [vol %] (20≤x≤25), it is preferred to satisfy Expression (1) below:

$$0.6 \times 10^6 \leq x^2 \cdot (y-40)^2 \cdot \sqrt{z} \leq 3.0 \times 10^6 \quad (1)$$

where y represents an immersing temperature [° C.], and z represents an immersion time [seconds].

According to the feature of the present embodiment that the sulfuric acid concentration x [vol %], temperature y [° C.], and immersion time z [seconds] satisfy the above relationship of Expression (1) when the stainless steel material is immersed in the sulfuric acid aqueous solution to form the passivation film 11, it is possible to remove an oxide film formed intrinsically on the surface of the stainless steel material and to form, on the stainless steel material, the passivation film 11 having the surface of which the Cr/O value and Cr/Fe value are controlled within the above-described ranges when measured by Auger electron spectroscopy analysis.

<Metal Plated Layer 20>

The metal plated layer 20 is a layer formed by subjecting a passivation film 11 of a stainless steel sheet 10 to a plating treatment. Meanwhile, according to the present embodiment, the metal that constitutes the metal plated layer 20 may be any one metal selected from among silver (Ag), palladium (Pd), platinum (Pt), rhodium (Rh), ruthenium (Ru), copper (Cu), tin (Sn), and chromium (Cr), or an alloy composed of at least two or more metals selected from among these metals. Among these, Ag, Pd or Pt is particularly preferred. Furthermore, the plating method for forming the metal plated layer 20 is not particularly limited; however, it is preferable to form the metal plated layer 20 by electroless plating using a plating bath containing salts of Ag, Pd, pt, Rh, Ru, Cu, Sn, Cr and the like.

Ag, Pd, Pt, Rh, Ru, Cu, Sn and Cr mentioned herein are all noble metals having large standard electrode potentials, and have a common property that the contact resistance is low. Therefore, even if any of the metals described above is used as the metal that constitutes the metal plated layer 20, the metal plate coated stainless material 100 thus obtainable has excellent plating properties, adhesiveness, corrosion resistance and electrical conductivity of the metal plated layer 20, as will be described below.

Meanwhile, the coverage of the metal plated layer 20, that is, the ratio of the area covered by the metal plated layer 20 at the surface of the passivation film 11 on which the metal plated layer 20 is formed, is preferably 95% or more. When the coverage of the metal plated layer 20 is adjusted to 95% or more, pinholes in the metal plated layer 20 can be reduced, and thereby, detachment of the metal plated layer 20 caused by pinholes can be prevented. Also, with regard to the metal plate coated stainless material 100 thus obtainable, corrosion resistance and electrical conductivity can be further enhanced.

In a case in which silver is used as the main metal that constitutes the metal plated layer 20, the thickness of the metal plated layer 20 is preferably 10 to 200 nm, and more preferably 20 to 100 nm. If the thickness of the metal plated layer 20 formed mainly from silver is too small, a uniform metal plated layer 20 is not formed on the passivation film 11 of the stainless steel sheet 10. Also, when the resultant plated product is used as the metal plate coated stainless material 100, there is a risk that corrosion resistance or electrical conductivity may be deteriorated. On the other hand, if the thickness of the metal plated layer 20 is too large, it is disadvantageous in terms of cost.

In a case in which a metal other than silver is used as the main metal that constitutes the metal plated layer 20, the thickness of the metal plated layer 20 is preferably 2 to 20 nm, and more preferably 2 to 5 nm. If the thickness of the metal plated layer 20 formed from such as metal other than silver is too small, a uniform metal plated layer 20 is not formed on the passivation film 11 of the stainless steel sheet 10. Also, when the resultant plated product is used as the metal plate coated stainless material 100, there is a risk that corrosion resistance or electrical conductivity may be deteriorated. On the other hand, if the thickness of the metal plated layer 20 is too large, it is disadvantageous in terms of cost.

As such, when the passivation film 11 of the stainless steel sheet 10 is subjected to a metal plating treatment, and thus a metal plated layer 20 is formed, a metal plate coated stainless material 100 can be obtained. According to the metal plate coated stainless material 100 of the present embodiment, as described above, with regard to the passivation film 11 formed on the stainless steel sheet 10, since the Cr/O value and the Cr/Fe value at the surface as measured by an Auger electron spectroscopy analysis are controlled to be in the ranges mentioned above the coverage and adhesiveness of the metal plated layer 20 formed on such a passivation film 11 can be enhanced. Therefore, even in a case in which the metal plated layer 20 on the surface is made into a thin film, the metal plate coated stainless material 100 of the present embodiment has high coverage and high adhesiveness of the metal plated layer 20. Thereby, the metal plate coated stainless material 100 has excellent corrosion resistance and electrical conductivity, and is advantageous in terms of cost. Thus, the metal plate coated stainless material 100 is suitably used as an electrical contact material used in connectors, switches, printed wiring boards and the like.

Incidentally, regarding the method for producing a metal plate coated stainless material having a silver plated layer formed thereon, a method of forming a silver plated layer directly on a stainless steel sheet by electroplating in an acidic state using a silver halide solution has been conventionally used. However, in such a method, if the silver plated layer is formed to have a small thickness, the coverage of the silver plated layer for the stainless steel sheet is decreased, and thus the stainless steel sheet becomes prone to corrosion. On the other hand, if the silver plated layer is formed to have a large thickness, since expensive silver should be used in a large amount, there is a problem that it is disadvantageous in terms of cost.

Furthermore, a method of forming a gold plated layer by directly subjecting a stainless steel sheet to a gold plating treatment has also been conventionally used. However, in such a method, if the gold plated layer is formed to have a small thickness, the coverage of the gold plated layer for the stainless steel sheet is decreased, and thus the stainless steel sheet becomes prone to corrosion. On the other hand, if the gold plated layer is formed to have a large thickness, since expensive gold should be used in a large amount, there is a problem that it is disadvantageous in terms of cost.

In this regard, according to the metal plate coated stainless material 100 related to the present embodiment, for a passivation film 11 formed on a stainless steel sheet 10, when the Cr/O value and the Cr/Fe value at the surface of the passivation film 11 measured by an Auger electron spectroscopy are controlled to the above-mentioned ranges, a metal plated layer 20 having excellent coverage and adhesiveness can be formed on the passivation film 11. Therefore, according to the present embodiment, even in a case in which the thickness of the metal plated layer 20 is made small, the metal plate coated stainless material 100 thus obtainable can be made into a stainless material which has excellent corrosion resistance and electrical conductivity and is advantageous in terms of cost.

Meanwhile, according to the present embodiment, as described above, in a case in which a method of immersing a stainless steel material in an aqueous solution of sulfuric acid is used, when the sulfuric acid concentration, the immersion temperature and the immersion time are regulated so as to satisfy the relationship of Expression (1) described above, a passivation film 11 in which the Cr/O value and the Cr/Fe value obtainable at the surface by an Auger electron spectroscopy analysis have been controlled to the ranges described above, can be formed. Thereby, a metal plated layer 20 having excellent coverage and adhesiveness can be formed on the passivation film 11.

The reason why such an effect is obtained by immersing a stainless steel material in an aqueous solution of sulfuric acid is not clearly known; however, the reason is considered to be as follows. That is, first, a stainless steel material naturally has an oxide film having a large content proportion of Cr atoms formed on the surface. When such a stainless steel material is immersed in an aqueous solution of sulfuric acid under the conditions described above, the oxide film of the surface can be removed, and in the passivation film 11 thus formed, the content proportion of Cr atoms that inhibit close adhesion of the metal plated layer 20 can be controlled. Furthermore, since active iron can be exposed at the surface, it is considered that the coverage and adhesiveness of the metal plated layer 20 can be enhanced thereby.

Here, FIG. 2 is a set of graphs illustrating the results of an analysis by X-ray photoelectron spectroscopy (XPS), representing the data of an Example and a Comparative Example described below, which are obtained by immersing an austenite-based stainless steel material (SUS316L) into an aqueous solution of sulfuric acid having a sulfuric acid concentration of 25 vol % at a temperature of 70° C.

Figure 2A:
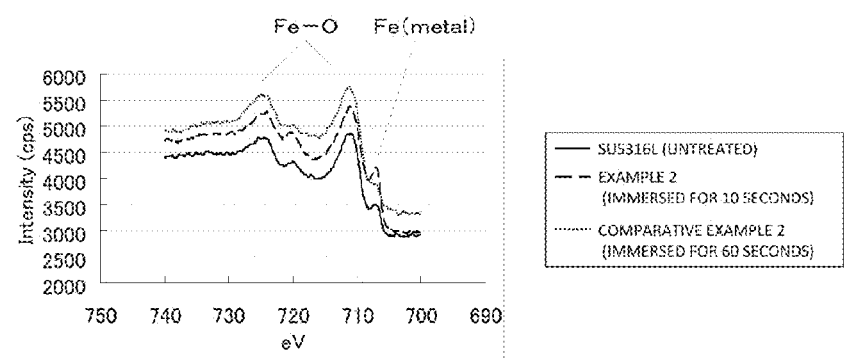
FIG. 2 is a set of graphs illustrating the results of analyzing passivation films 11 of the stainless steel sheets 10 obtained in an Example and a Comparative Example, by X-ray photoelectron spectroscopy (XPS)
Figure 2B:
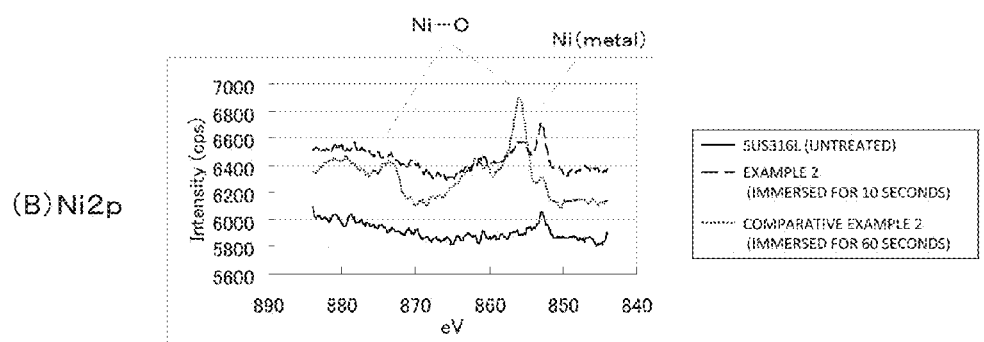
Figure 2C:
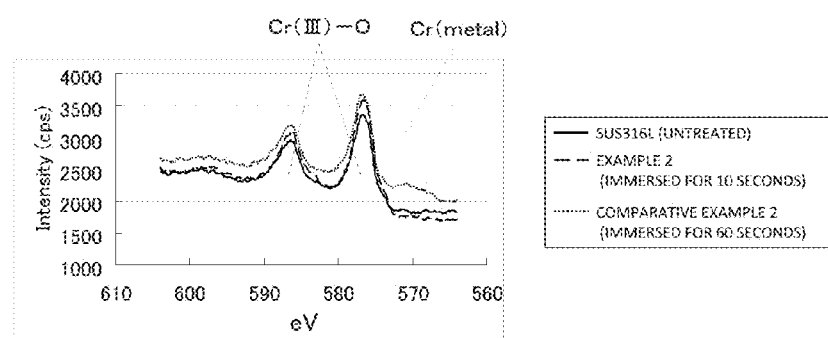
Figure 2D:
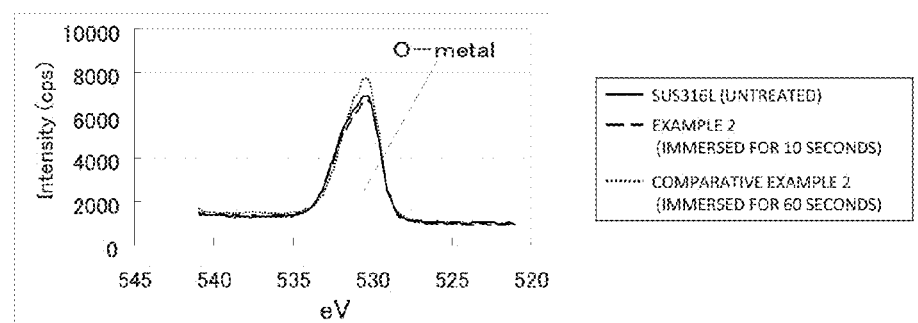

Meanwhile, in FIG. 2, FIG. 2(A) illustrates the results of measuring the peak of Fe2p, FIG. 2(B) illustrates the results of Ni2p, FIG. 2(C) illustrates the results of Cr2p, and FIG. 2(D) illustrates the results of O1s. Furthermore, in the respective graphs of FIG. 2(A) to FIG. 2(D), the measurement results for an untreated stainless steel material before being immersed into an aqueous solution of sulfuric acid are indicated with solid lines; the measurement results for the stainless steel material after being immersed in an aqueous solution of sulfuric acid for 10 seconds are indicated with broken lines; and the measurement results for the stainless steel material after being immersed in an aqueous solution of sulfuric acid for 60 seconds are indicated with dotted lines.

In FIG. 2(A), the peaks at near 712 eV and 725 eV represent iron oxide (Fe—O), and the peak at near 707 eV represents elemental iron (Fe(metal)). In FIG. 2(B), peaks at near 874 eV and 856 eV represent nickel oxide (Ni—O), and the peak at near 853.5 eV represents elemental nickel (Ni(metal)). In FIG. 2(C), peaks at near 586 eV and 577 eV represent chromium oxide (Cr(III)-O), and the peak at near 574 eV represents elemental chromium (Cr(metal)). In FIG. 2(D), the peak at near 531 eV represents the oxygen bonded to a metal such as iron, nickel or chromium (O-metal).

As illustrated in FIG. 2(A), when a stainless steel material is immersed in an aqueous solution of sulfuric acid having a sulfuric acid concentration of 25 vol % for 10 seconds at 70° C., the size of the peak of Fe(metal) at near 707 eV is larger than the Fe in an untreated state that has not been immersed in an aqueous solution of sulfuric acid. Therefore, by immersing a stainless steel material in an aqueous solution of sulfuric acid, it can be confirmed that the oxide film containing a large amount of Cr atoms on the stainless steel sheet is appropriately removed, and active elemental iron (Fe(metal)) is exposed at the surface of the passivation film 11 thus formed.

Here, in a case in which the sulfuric acid concentration is too low when the stainless steel material is immersed in an aqueous solution of sulfuric acid, in a case in which the immersion temperature is too low, or in a case in which the immersion time is too short, the oxide film containing a large amount of Cr atoms on the stainless steel sheet cannot be completely removed, the content proportion of Cr atoms at the outermost surface increases (that is, the Cr/O value and the Cr/Fe value become too high), and the exposure of elemental iron (Fe(metal)) at the surface of the passivation film 11 thus formed is insufficiently achieved. Therefore, the coverage and adhesiveness of the metal plated layer 20 are deteriorated.

Meanwhile, FIG. 2(A) to FIG. 2(D) described above illustrates an example of changing only the immersion time while fixing the sulfuric acid concentration at 25 vol % and temperature at 70° C., when a stainless steel material was immersed in an aqueous solution of sulfuric acid. In regard to such an example, as illustrated in the graph of FIG. 2(A), when the immersion time is set to 60 seconds, the peak of Fe(metal) at near 707 eV becomes smaller compared to the peak of an untreated state, and the proportion of elemental iron (Fe(metal)) at the surface of the passivation film 11 tends to decrease.

In this regard, according to the present embodiment, even if the immersion time is adjusted to 60 seconds or longer, for example, when the relationship between the sulfuric acid concentration, the temperature and the immersion time is regulated to satisfy the above Expression (1), a decrease in the peak of Fe(metal) at the surface of the passivation film 11 thus formed is suppressed. Thereby, the value of the proportion Fe(metal)/Fe(total) can be controlled to the range described above, and the coverage and adhesiveness of the metal plated layer 20 formed on the passivation film 11 can be appropriately enhanced.

Furthermore, according to the present embodiment, when a stainless steel material is immersed in an aqueous solution of sulfuric acid, the proportion of elemental iron (Fe(metal)) with respect to the total amount of Fe atoms (Fe(total)) at the surface of the passivation film 11 thus formed, (Fe(metal)/Fe(total)), is preferably 14% or higher, and more preferably 18% or higher. When the value of such proportion Fe(metal)/Fe(total) is adjusted to 14% or higher, active elemental iron can be appropriately exposed at the surface of the passivation film 11. Therefore, the coverage and adhesiveness of the metal plated layer 20 formed on such a passivation film 11 can be further enhanced.

Meanwhile, regarding a method for determining the value of Fe(metal)/Fe(total), for example, a method of determining the value of the proportion, based on the measurement results obtained by X-ray photoelectron spectroscopy (XPS) as illustrated in FIG. 2(A) described above, by subtracting the background from the measurement results, and then calculating the proportion of the integrated value of the peak of elemental iron (Fe(metal)) with respect to the total value of the integrated value of the peak of iron oxide (Fe—O) and the integrated value of the peak of elemental iron (Fe (metal)), may be used.

Furthermore, regarding a method of adjusting the value of the proportion Fe(metal)/Fe(total) at the surface of the passivation film 11 to the above-described range, for example, a method of adjusting the sulfuric acid concentration, temperature and the immersion time employed at the time of immersing a stainless steel material in an aqueous solution of sulfuric acid, so as to be in a relationship that satisfies the above Expression (1), may be used.

Furthermore, according to the present embodiment, when a stainless steel is immersed into an aqueous solution of sulfuric acid, in a case in which an austenite-based stainless steel material or the like containing nickel is used as the stainless steel material, the proportion of elemental nickel (Ni(metal)) with respect to the total amount of Ni atoms (Ni(total)) at the surface of the passivation film 11 thus formed, (Ni(metal)/Ni(total)), is preferably 18% or higher, and more preferably 25% or higher. When the value of such proportion Ni(metal)/Ni(total) is adjusted to 18% or higher, the proportion of nickel oxide having very brittle properties at the surface of the passivation film 11 can be decreased. Thus, the coverage and adhesiveness of the metal plated layer 20 can be further enhanced.

That is, on the occasion of immersing a stainless steel material in an aqueous solution of sulfuric acid, in a case in which the sulfuric acid concentration is too high, in a case in which the temperature is too high, or in a case in which the immersion time is too long, the stainless steel sheet is corroded by the aqueous solution of sulfuric acid after the passivation film 11 has been formed. Thereby, Fe from the stainless steel sheet preferentially liquates. Therefore, at the surface of the passivation film 11, as the content proportion of Cr atoms becomes relatively large (that is, the Cr/O value and the Cr/Fe value become too high), and as nickel oxide (Ni—O) are produced, the coverage and adhesiveness of the metal plated layer 20 thus formed are deteriorated due to the influence of Cr and nickel oxide. Here, since nickel oxide has very brittle properties, in a case in which the metal plated layer 20 is formed on a part containing a large amount of nickel oxide in the passivation film 11, the nickel oxide itself is detached from the stainless steel sheet 10, and thereby the coverage and adhesiveness of the metal plated layer 20 are deteriorated.

In this regard, according to the present embodiment, when the proportion Ni(metal)/Ni(total) at the surface of the passivation film 11 is adjusted to the range described above, the proportion of elemental nickel increases, and the proportion of nickel oxide having very brittle properties can be reduced. Therefore, the coverage and adhesiveness of the metal plated layer 20 can be further enhanced.

Meanwhile, regarding a method of determining the value of Ni(metal)/Ni(total), for example, a method of determining the value of the proportion, based on the measurement results obtained by X-ray photoelectron spectroscopy (XPS) as illustrated in FIG. 2(B) described above, by subtracting the background from the measurement results, and then calculating the proportion of the integrated value of the peak of elemental nickel (Ni(metal)) with respect to the total value of the integrated value of the peak of nickel oxide (Ni—O) and the integrated value of the peak of elemental nickel (Ni(metal)), may be used.

Furthermore, regarding a method of adjusting the value of Ni(metal)/Ni(total) at the surface of the passivation film 11 to the range described above, for example, a method of adjusting the sulfuric acid concentration, temperature, and the immersion time at the time of immersing the stainless steel material in an aqueous solution of sulfuric acid, so as to in a relationship that satisfies the above Expression (1), may be used.

According to the present embodiment, on the occasion in which a stainless steel material is immersed in an aqueous solution of sulfuric acid, the surface roughness of the passivation film 11 thus formed is such that the arithmetic mean roughness Ra is preferably 0.015 □m or more preferably 0.018 □m or more adjusted to the range described above, at the time of forming a metal plated layer 20 on the passivation film 11, the coverage and adhesiveness of the metal plated layer 20 are further enhanced by the anchoring effect.

Regarding a method of adjusting the surface roughness of the passivation film 11 to the range described above, for example, a method of prolonging the immersion time when the stainless steel material is immersed in an aqueous solution of sulfuric acid, may be used. In this case, as the immersion time is longer, the surface roughness of the passivation film 11 thus formed becomes larger. Similarly, also in the case of increasing the sulfuric acid concentration or temperature when the stainless steel material is immersed in an aqueous solution of sulfuric acid, the surface roughness of the passivation film 11 thus formed becomes large, and the coverage and adhesiveness of the metal plated layer 20 are further enhanced.

According to the present embodiment, the metal plate coated stainless material 100 can also be used as a separator for a fuel cell. A separator for fuel cells is used as a member of a fuel battery cell that constitutes a fuel cell stack, and has a function of supplying a fuel gas or air to an electrode through gas flow channels and a function of collecting the electrons generated in the electrode. When the metal plate coated stainless material 100 is used as a separator for a fuel cell, regarding the stainless steel sheet 10, it is preferable to use a stainless steel sheet in which surface irregularities that function as flow channels of the fuel gas or air (gas flow channels) have been formed in advance on the surface. The method for forming the gas flow channels is not particularly limited; however, for example, a method of forming the gas flow channels by press processing may be used.

Usually, in a case in which a stainless steel sheet having a metal plated layer formed on the surface is used as a separator for a fuel cell, since the separator for a fuel cell is exposed to an environment of high temperature and an acidic atmosphere inside a fuel cell, when the coverage of the metal plated layer on the surface is low, corrosion of the stainless steel sheet that serves as a substrate proceeds early. Thereby, the electrical resistance value is increased by the corrosion product generated at the surface of the stainless steel sheet, and there is a problem that the function as a separator for a fuel cell that collects the electrons generated in the electrode is deteriorated.

On the contrary, according to the metal plate coated stainless material 100 of the present embodiment, since a metal plated layer 20 having excellent coverage and adhesiveness is formed thereon as described above, the metal plate coated stainless material 100 can be suitably used as such a separator for a fuel cell.

Meanwhile, according to the present embodiment, the metal that constitutes the metal plated layer 20 may be, as described above, any one metal selected from among Ag, Pd, Pt, Rh, Ru, Cu, Sn and Cr, or an alloy composed of at least two or more metals selected from among these metals. Thus, depending on these metals that constitute the metal plated layer 20, the metal plate coated stainless material 100 can be particularly suitably used for the following applications.

First, a metal plate coated stainless material 100 (silver) having a silver plated layer formed thereon as the metal plated layer 20, can be particularly suitably used as an electrical contact material for connectors, switches, printed wiring boards and the like, by utilizing the properties of having excellent electrical conductivity and thermal conductivity and having a high reflectance of light in the visible light region, which are the characteristics of silver.

Furthermore, a metal plate coated stainless material 100 (palladium) having a palladium plated layer formed thereon as the metal plated layer 20 can be particularly suitably used as a member of a fuel cell by utilizing the function of storing hydrogen or the catalytic function exhibited by palladium.

A metal plate coated stainless material 100 (platinum) having a platinum plated layer formed thereon as the metal plated layer 20 can be particularly suitably used as a member of a fuel cell, by utilizing the catalytic function exhibited by platinum.

A metal plate coated stainless material 100 (rhodium) having a rhodium plated layer formed thereon as the metal plated layer 20 can be particularly suitably used as a member of a fuel cell, by utilizing the catalytic function exhibited by rhodium. Furthermore, since rhodium has high hardness and has a property of having a high reflectance of light in the visible light region, the metal plate coated stainless material 100 (rhodium) can also be suitably used as an electrical contact material for connectors, switches, printed wiring boards and the like.

A metal plate coated stainless material 100 (ruthenium) having a ruthenium plated layer formed thereon as the metal plated layer 20 can be particularly suitably used as a member of a fuel cell, by utilizing the properties of having a high melting point and a high boiling point, which are characteristics of ruthenium. Furthermore, since ruthenium also has a property of having high hardness, the metal plate coated stainless material 100 (ruthenium) can also be suitably used as an electrical contact material for connectors, switches, printed wiring boards and the like.

A metal plate coated stainless material 100 (copper) having a copper plated layer formed thereon as the metal plated layer 20 can be particularly suitably used as an electrical contact material for connectors, switches, printed wiring boards and the like, by utilizing the properties of having excellent electrical conductivity and thermal conductivity, which are characteristics of copper.

A metal plate coated stainless material 100 (tin) having a tin plated layer formed thereon as a metal plated layer 20 can be particularly suitably used as an electrical contact material for connectors, switches, printed wiring boards and the like, by utilizing a property that joining with a joining material such as solder can be easily implemented, which is a characteristic of tin.

A metal plate coated stainless material 100 (chromium) having a chromium plated layer formed thereon as the metal plated layer 20 can be particularly suitably used as a member of a fuel cell, since diffusion iron in the metal plate coated stainless material 100 (chromium) is suppressed by the function of chromium, and thereby liquation of iron can be suppressed.

Meanwhile, among these metals, metals other than Pt (Ag, Pd, Rh, Ru, Cu, Sn and Cr) are relatively inexpensive, and the metal plate coated stainless material 100 thus obtainable is advantageous in terms of cost.

EXAMPLES

Hereinafter, the present invention will be more specifically described with reference to examples, but the present invention is not limited to these examples.

The definition and evaluation method for each property is as follows.

<Measurement of Cr/O Value and Cr/Fe Value>

A field emission Auger microprobe (AES) (model number: JAMP-9500F, available from JEOL Ltd.) was used for a stainless steel sheet 10 formed with a passivation film 11 at the surface to measure the atomic percentages of Cr, O, and Fe at five locations, and the obtained results were averaged thereby to obtain the Cr/O value (at % of Cr/at % of O) and the Cr/Fe value (at % of Cr/at % of Fe). The measurement of the Cr/a value and Cr/Fe value was performed all Examples and all Comparative Examples to be described later.

<XRD Analysis>

An X-ray analytical instrumentation (model number: RINT-2500, available from Rigaku Corporation) was used for the surface of a stainless steel sheet 10 formed with a passivation film 11 at the surface to identify crystals contained in the surface of the stainless steel sheet 10. The XRD analysis was performed only for Example 3 of the examples and the comparative examples to be described later. For comparison, the XRD analysis was also performed in a similar manner for a stainless steel material (SUS316L) without being immersed in a sulfuric acid aqueous solution.

<XPS Measurement>

An X-ray photoelectron spectrometer (model number: VersaProbe II, available from ULVAC-PHI, Inc) was used for the surface of a passivation film 11 formed on a stainless steel sheet 10 to perform XPS measurement by measuring respective peaks of Fe2p, Ni2p, Cr2p, and O1s. The XPS measurement was performed only for Example 2 and Comparative Example 2 of the examples and the comparative examples to be described later. For comparison, the XPS measurement was also performed in a similar manner for a stainless steel material (SUS316L) without being immersed in a sulfuric acid aqueous solution.

<Measurement of Surface Roughness>

A laser microscope (LEXT OLS3500 available from Olympus Corporation) was used for the surface of a passivation film 11 formed on a stainless steel sheet 10 to measure the arithmetic average roughness Ra in accordance with JIS B 0601: 1994. The measurement of surface roughness was performed only for Examples 1, 2, and 4 and Comparative Examples 1 and 2 of the examples and the comparative examples to be described later. For comparison, the measurement of surface roughness was also performed in a similar manner for a stainless steel material (SUS316L) without being immersed in a sulfuric acid aqueous solution.

<Observation of Cross-Section>

After forming a carbon deposited film by carbon vapor deposition on a stainless steel sheet 10 formed with a passivation film 11 at the surface, the stainless steel sheet 10 was cut to expose a cross-section, and a cross-sectional image was obtained by measuring the exposed cross-section using a scanning-type electron microscope (model number: HD-2700, available from Hitachi High-Technologies Corporation). The observation of cross-section was performed only for Example 2 and Comparative Example 2 of the examples and the comparative examples to be described later. For comparison, the observation of cross-section was also performed in a similar manner for a stainless steel material (SUS316L) without being immersed in a sulfuric acid aqueous solution.

<Measurement of Electron Beam Diffraction Pattern>

A transmission-type electron microscope (model number: HF-2000, available from Hitachi High-Technologies Corporation) was used to measure the surface of a passivation film 11 formed on a stainless steel sheet 10, and an electron beam diffraction pattern was obtained. The measurement of electron beam diffraction pattern was performed only for Example 2 and Comparative Example 2 of the examples and the comparative examples to be described later. For comparison, the measurement of electron beam diffraction pattern was also performed in a similar manner for a stainless steel material (SUS316L) without being immersed in a sulfuric acid aqueous solution.

<Measurement of Contact Resistance Value>

Figure 9:
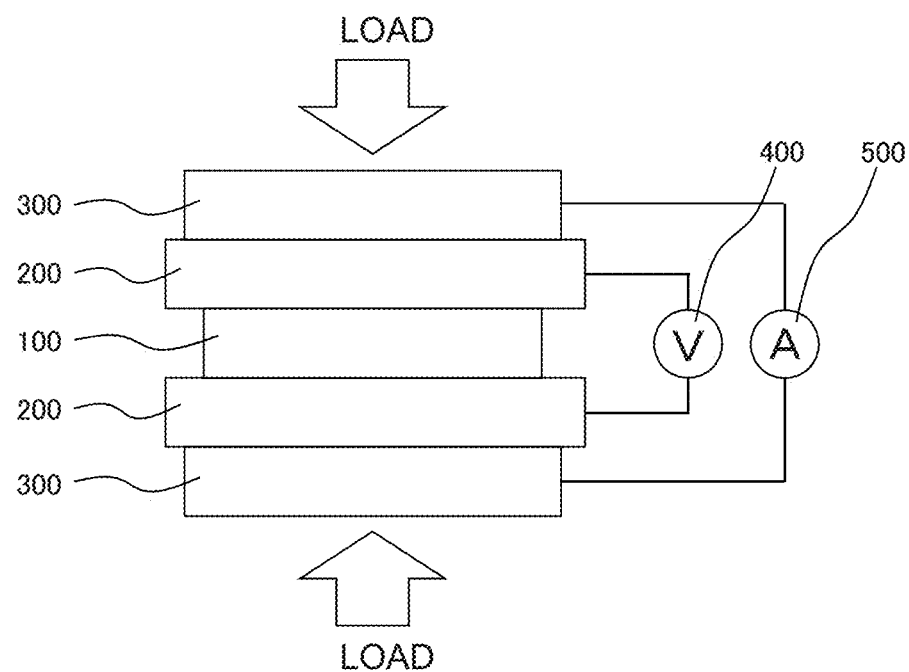
FIG. 9 is a diagram for explaining the method for measuring the contact resistance of a metal plate coated stainless material 100 obtained in an Example.

For a metal plate coated stainless material 100, measurement of the contact resistance value was performed using a measurement system as shown in FIG. 9. The measurement system shown in FIG. 9 is configured of: the metal plate coated stainless material 100; carbon cloths 200, which are used as diffusion layers for fuel cells; metal plate coated copper electrodes 300; a voltmeter 400; and an ammeter 500. Specifically, at the time of measurement of the contact resistance value, the metal plate coated stainless material 100 was first worked into a size of width of 20 mm, length of 20 mm and thickness of 1.27 mm and fixed by being interposed between the metal plate coated copper electrodes 300 via the carbon cloths 200 (part number: TGP-H-090, available from Toray Industries, Inc), and the measurement system was thus obtained as shown in FIG. 9. Then, the contact resistance values between the upper and lower carbon cloths 200 sandwiching the test piece were measured using an ohm meter (Milli-Ohm HiTESTER 3540 available from HIOKI E.E. CORPORATION) while applying a load of 10 kg/cm$^2$ to the metal plate coated copper electrodes 300. The measurement of contact resistance value was performed only for Example 4 of the examples and the comparative examples to be described later. For comparison, the measurement of contact resistance value was also performed in a similar manner for a stainless steel material (SUS316L) without being immersed in a sulfuric acid aqueous solution, after working the stainless steel material into a size of width of 20 mm, length of 20 mm and thickness of 1.0 mm.

Example 1

First, a stainless steel material (SUS316L) for forming a stainless steel sheet 10 was prepared. Then, the prepared stainless steel material was immersed in a sulfuric acid aqueous solution of a sulfuric acid concentration of 25 vol % under a condition of a temperature of 70° C. and an immersion time of 5 seconds, and the stainless steel sheet 10 formed with a passivation film 11 on the surface was thus obtained.

For the stainless steel sheet 10 formed with such a passivation film 11, measurement of the Cr/O value and Cr/Fe value and measurement of the surface roughness were performed in accordance with the above-described methods. Results are listed in Table 1 and shown in FIGS. 3 and 4. Table 1 also presents results of calculating the term in the above Expression (1) relating to variables, i.e., the sulfuric acid concentration x [vol %], temperature y [° C.], and immersion time z [seconds] when immersing the stainless steel material in the sulfuric acid aqueous solution.

Figure 3:
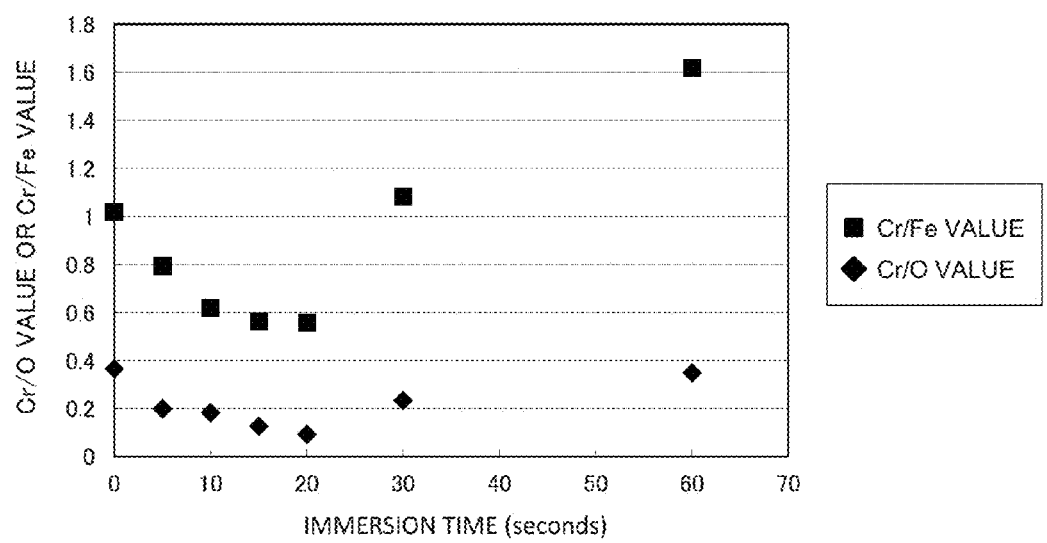
FIG. 3 is a graph illustrating the results of measuring the Cr/O values and the Cr/Fe values at the surface of the passivation films 11 of the stainless steel sheets 10 obtained in Examples and Comparative Examples, by an Auger electron spectroscopy analysis.

FIG. 3 is a graph illustrating the measurement results of the Cr/O value and the Cr/Fe value. The horizontal axis represents the immersion time for immersing a stainless steel material in an aqueous solution of sulfuric acid, and the vertical axis represents the Cr/O value and the Cr/Fe value measured by a scan type Auger electron spectroscopy analyzer (AES). Here, FIG. 3 illustrates the measurement results of Example 1, and Examples 2 to 4 and Comparative Examples 1, 2 and 11 that will be described below.

Figure 4:
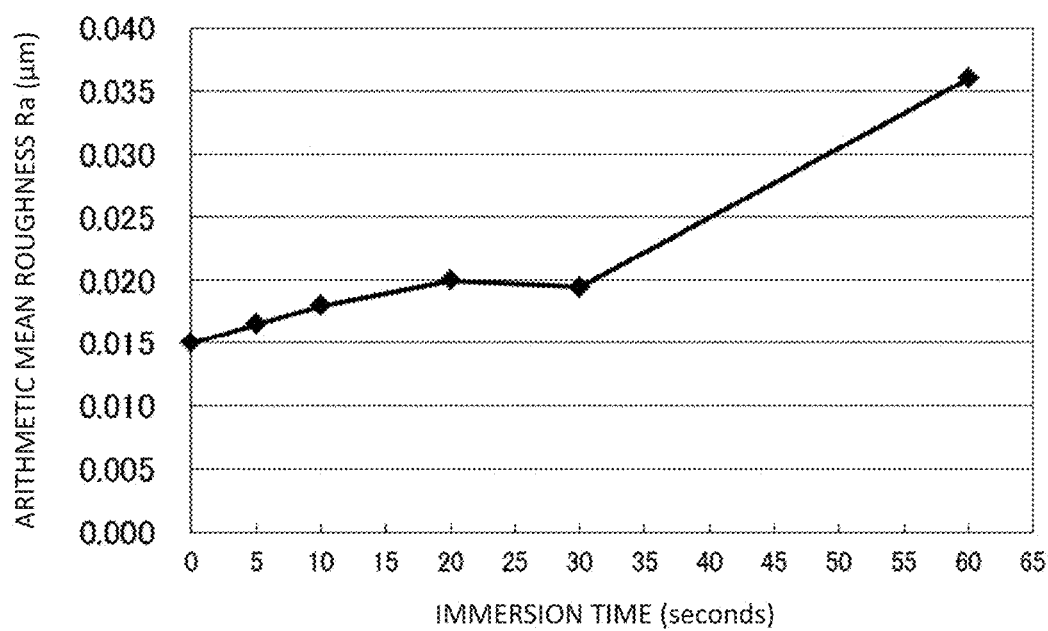
FIG. 4 is a diagram illustrating the results of measuring the surface roughness of the passivation films 11 of the stainless steel sheets 10 obtained in an Example and a Comparative Example.

Furthermore, FIG. 4 is a graph illustrating the measurement results of surface roughness, and the horizontal axis represents the immersion time for immersing a stainless steel material in an aqueous solution of sulfuric acid, while the vertical axis represents the arithmetic mean roughness Ra.

Examples 2 to 8

Stainless steel sheets 10 were produced in the same manner as in Example 1, except that the concentration, temperature and the immersion time employed at the time of immersing a stainless steel material in an aqueous solution of sulfuric acid were changed as indicated in Table 1. Measurement of the Cr/O value and the Cr/Fe value, an XRD analysis, an XPS analysis, measurement of the surface roughness, observation of cross-sections, and an analysis of electron beam diffraction patterns were carried out. The results are presented in Table 1, and FIGS. 2 to 7.

Meanwhile, FIG. 2 illustrates the results of measuring the peaks of Fe2p, Ni2p, Cr2p and O1s at the surface of the passivation film 11 formed on the stainless steel sheet 10 by an XPS analysis. Here, FIG. 2(A) illustrates the results of measuring the peak of Fe2p, FIG. 2(B) illustrates the results of Ni2p, FIG. 2(C) illustrates the results of Cr2p, and FIG. 2(D) illustrates the results of O1s. Also, in the respective graphs of FIG. 2(A) to FIG. 2(D), the results of Example 2 are indicated with broken lines, the results of Comparative Example 2 described below are indicated with dotted lines, and the measurement results for a stainless steel material (SUS316L) that was not immersed in an aqueous solution of sulfuric acid are indicated with solid lines.

Figure 5:
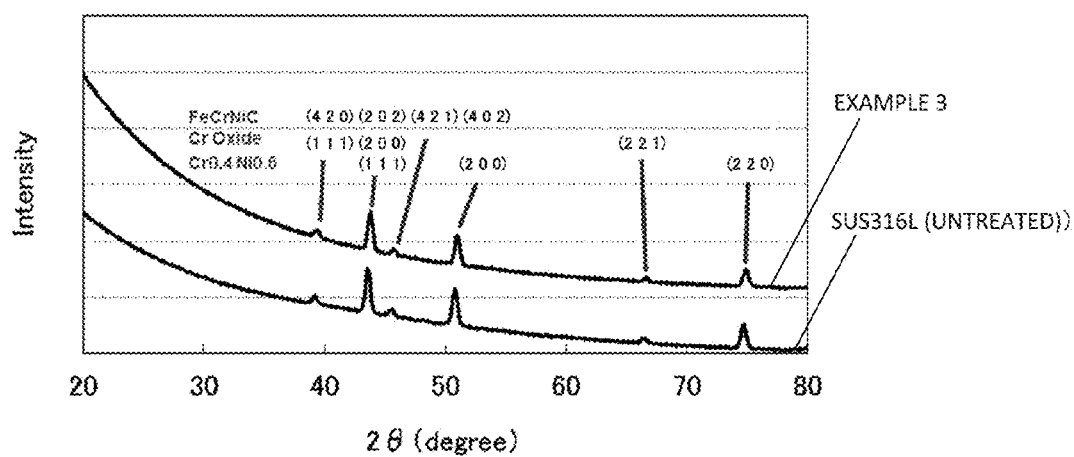
FIG. 5 is a graph illustrating the results of performing an XRD analysis for the passivation film 11 of the stainless steel sheet 10 obtained in an Example, using an X-ray diffraction apparatus.

FIG. 5 is a graph illustrating the results of an XRD analysis. The horizontal axis represents the diffraction angle, and the vertical axis represents the intensity of diffracted X-rays detected by an X-ray analytical instrumentation. In the graph of FIG. 5, each of the peaks has the information on the crystal from which the peak originates and on the crystal plane, described together. Meanwhile, in the graph of FIG. 5, FeCrNiC represents the crystal of FeCrNiC compound, CrOxide represents the crystal of chromium oxide, and Cr0.4Ni0.6 represents the crystal of a CrNi alloy having a Cr:Ni ratio of 0.4:0.6 (atom %).

Figure 6A:
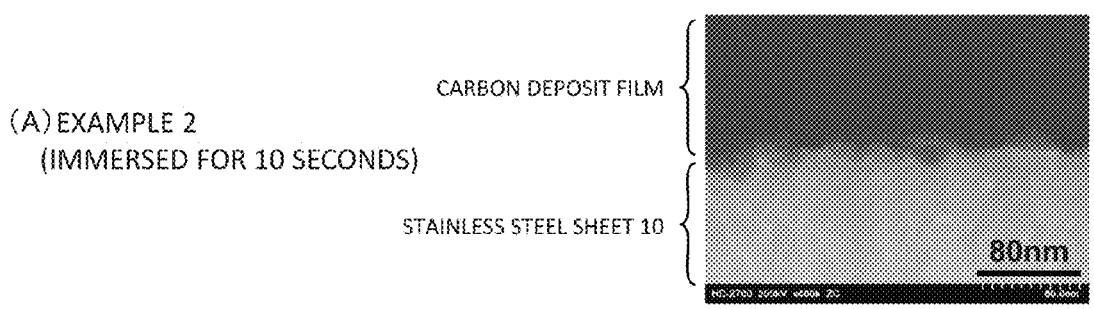
FIG. 6 is a set of photographs of the cross-sections of the passivation films 11 of the stainless steel sheets 10 obtained in an Example and a Comparative Example.
Figure 6B:
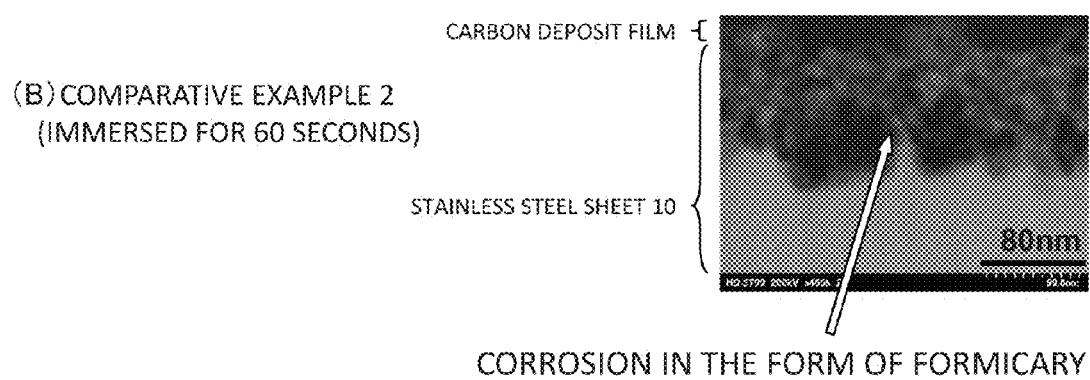
Figure 6C:
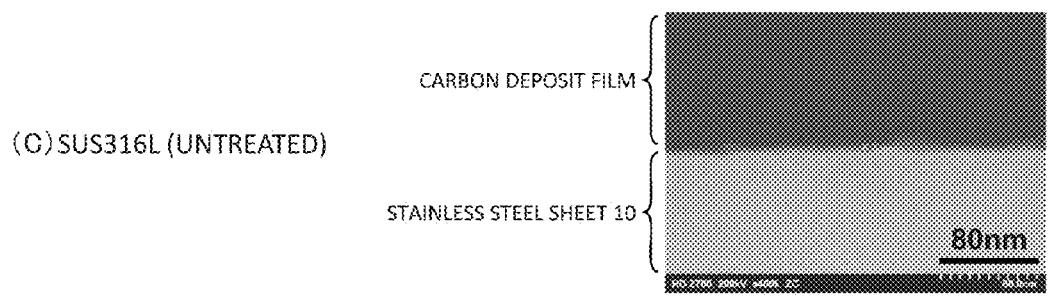

FIG. 6 is a set of diagrams illustrating the results of an observation of cross-sections of stainless steel sheets 10 each having a passivation film 11 formed on the surface. Meanwhile, FIG. 6(A) illustrates the results of Example 2, FIG. 6(B) illustrates the results of Comparative Example 2 that will be described below, and FIG. 6(C) illustrates the results of a stainless steel material (SUS316L) that was not immersed in an aqueous solution of sulfuric acid.

Figure 7A:
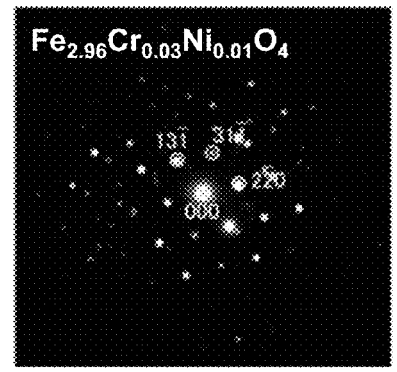
FIG. 7 is a set of diagrams illustrating electron beam diffraction patterns for the passivation films 11 of the stainless steel sheets 10 obtained in an Example and a Comparative Example.
Figure 7B:
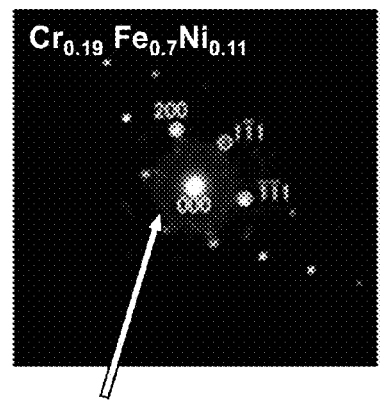
Figure 7C:
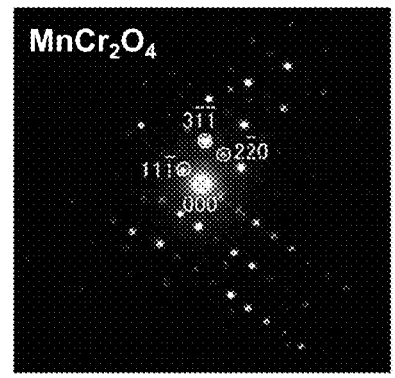

FIG. 7 illustrates the results of measuring electron beam diffraction patterns at the surfaces of passivation film 11 is formed on stainless sheets 10. Meanwhile, FIG. 7(A) is a diagram illustrating the results of Example 2, FIG. 7(B) is a diagram illustrating the results of Comparative Example 2 that will be described below, FIG. 7(C) is a diagram illustrating the results of a stainless steel material (SUS316L) that was not immersed in an aqueous solution of sulfuric acid. Here, FIG. 7(A) illustrates the analysis results of a diffraction pattern obtained from a crystal containing a relatively large amount of elemental iron (element ratio: Fe2.96Cr0.03Ni0.01O4). Similarly, FIG. 7(B) illustrates the analysis results of a diffraction pattern obtained from a crystal containing a relatively large amount of nickel oxide (element ratio: Cr0.19Fe0.7Ni0.11). FIG. 7(C) illustrates the analysis results of a diffraction pattern obtained from a crystal of chromium oxide (MnCr2O4).

Comparative Examples 1 to 5

Stainless steel sheets 10 were produced in the same manner as in Example 1, except that the concentration of the aqueous solution of sulfuric acid and the immersion time employed at the time of immersing a stainless steel material in an aqueous solution of sulfuric acid were changed as indicated in Table 1. Measurement of the Cr/O value and the Cr/Fe value, an XRD analysis, an XPS analysis, measurement of the surface roughness, observation of cross-sections, and an analysis of electron beam diffraction patterns were carried out. The results are presented in Table 1, and FIGS. 2 to 4, 6, and 7.

TABLE 1

| | Kind of acid | Concentration [vol %] | Temperature [° C.] | Immersion time [seconds] | Calculated value of $x^2 \cdot (y-40)^2 \cdot \sqrt{z}$ (×10$^6$) | Passivation film Cr/O value | Passivation film Cr/Fe value |
|---|---|---|---|---|---|---|---|
| Example 1 | Sulfuric acid | 25 | 70 | 5 | 1.26 | 0.1987 | 0.7918 |
| Example 2 | | | | 10 | 1.78 | 0.1833 | 0.6175 |
| Example 3 | | | | 15 | 2.18 | 0.1264 | 0.5631 |
| Example 4 | | | | 20 | 2.52 | 0.092 | 0.5577 |
| Example 5 | | | 60 | 120 | 2.74 | 0.1844 | 0.6674 |
| Example 6 | | | 50 | 180 | 0.84 | 0.1245 | 0.5817 |
| Example 7 | | 20 | 70 | 60 | 2.79 | 0.1423 | 0.5674 |
| Example 8 | | | 50 | 300 | 0.69 | 0.191 | 0.7222 |
| Comparative Example 1 | | 25 | 70 | 30 | 3.08 | 0.2338 | 1.082 |
| Comparative Example 2 | | | | 60 | 4.36 | 0.3487 | 1.6158 |
| Comparative Example 3 | | | | 300 | 9.74 | 0.4634 | 2.2461 |
| Comparative Example 4 | | 5 | | 30 | 0.12 | 0.3121 | 0.9572 |
| Comparative Example 5 | | 10 | | 300 | 1.56 | 0.4624 | 1.2468 |

Comparative Examples 6 to 9

Stainless steel sheets 10 were produced in the same manner as in Example 1, except that instead of a treatment of immersing a stainless steel material in an aqueous solution of sulfuric acid, a treatment of immersing a stainless steel material in hydrochloric acid was carried out, and the hydrochloric acid concentration, temperature, and the immersion time employed at the time of immersion in hydrochloric acid were changed as indicated in Table 2. The Cr/O value and the Cr/Fe value were measured according to the method described above. The results are presented in Table 2.

Comparative Example 10

A stainless steel sheet 10 was produced in the same manner as in Example 1, except that instead of a treatment immersing a stainless steel material in an aqueous solution of sulfuric acid, a treatment of immersing a stainless steel material in an acidic aqueous solution having a sulfuric acid concentration of 6 vol % and a phosphoric acid concentration of 4 vol %, and the temperature and immersion time employed at the time of immersion in this acidic aqueous solution were changed as indicated in Table 2. The Cr/O value and the Cr/Fe value were measured according to the method described above. The results are presented in Table 2.

Comparative Example 11

For the stainless steel material (SUS316L) used in Example 1, the Cr/O value and the Cr/Fe value were measured according to the method described above, without immersing the stainless steel material in an aqueous solution of sulfuric acid. The results are presented in Table 2 and FIG. 3.

TABLE 2

| | Kind of acid | Concentration [vol %] | Temperature [° C.] | Immersion time [seconds] | Passivation film Cr/O value | Passivation film Cr/Fe value |
|---|---|---|---|---|---|---|
| Comparative Example 6 | Hydrochloric acid | 5 | 60 | 30 | 0.3783 | 1.0769 |
| Comparative Example 7 | | | | 300 | 0.4126 | 1.0922 |
| Comparative Example 8 | | 25 | | 10 | 0.4157 | 1.16627 |
| Comparative Example 9 | | | | 120 | 0.4664 | 1.4352 |
| Comparative Example 10 | Sulfuric acid + phosphoric acid | Sulfuric acid: 6 Phosphoric acid: 4 | 70 | 30 | 0.4374 | 1.1298 |
| Comparative Example 11 | | | No immersion | | 0.3655 | 1.018 |

<Formation of Silver Plated Layer>

Furthermore, among the Examples and Comparative Examples described above, each of the stainless steel sheets 10 of Examples 2 and 3 and Comparative Examples 1 and 11 was subjected to an electroless silver plating treatment, and thereby a silver plated layer having a thickness of about 60 nm was formed as a metal plated layer 20 on the passivation film 11 of the stainless steel sheet 10. Thus, metal plate coated stainless materials 100 (silver) were obtained.

Then, for the metal plate coated stainless materials 100 (silver) obtained as such, an evaluation of the plating properties of the silver plated layer were conducted. Specifically, the surface of a metal plate coated stainless material 100 (silver) was analyzed with a fluorescent X-ray analyzer (manufactured by Rigaku Corp., product No.: ZSX100e) to determine the presence or absence of Ag. When Ag was detected, it was considered that a silver plated layer was satisfactorily formed, and thus the evaluation of the plating properties was carried out.

As a result, in the metal plate coated stainless materials 100 (silver) obtained from the stainless steel sheets 10 of Examples 2 and 3 and Comparative Example 1, Ag was detected from the surface, and thus it was confirmed that silver plated layers were satisfactorily formed. On the other hand, in the metal plate coated stainless material 100 (silver) obtained from the stainless steel sheet 10 of Comparative Example 11, Ag was not detected from the surface, and thus it was confirmed that the plating properties of the silver plated layer were unsatisfactory.

Furthermore, for the metal plate coated stainless materials 100 (silver) obtained from the stainless steel sheets 10 of Examples 2 and 3 and Comparative Example 1, an evaluation of adhesiveness of the silver plated layers was carried out. Specifically, a peeling test was performed by adhering an adhesive tape (manufactured by Nichiban Co., Ltd., NICETACK powerful type) to the silver plated layer of a metal plate coated stainless material 100 (silver), and then detaching the adhesive tape. Thereafter, an observation of the detachment state of the silver plated layer was made, and in a case in which detachment was not recognized, it was considered that the silver plated layer had satisfactory adhesiveness. Thus, the evaluation of adhesiveness was carried out.

As a result, in the metal plate coated stainless materials 100 (silver) obtained from the stainless steel sheets 10 of Examples 2 and 3, detachment of the silver plated layer was not recognized, and it was confirmed that the silver plate layer had satisfactory adhesiveness. On the other hand, in the metal plate coated stainless material 100 (silver) obtained from the stainless steel sheet 10 of Comparative Example 1, a portion of the silver plated layer was detached, and it was confirmed that the adhesiveness of the silver plated layer was insufficient.

Thereby, it was confirmed from the results of Table 1 that in regard to Examples 2 and 3 in which a passivation film having a Cr/O value in the range of 0.05 to 0.2 and a Cr/Fe value in the range of 0.5 to 0.8 at the surface as measured by an Auger electron spectroscopy analysis was formed on each of the stainless steel sheets 10, the silver plated layer formed on the passivation film 11 had excellent plating properties and adhesiveness.

On the other hand, it was confirmed from the results of Tables 1 and 2 that in Comparative Examples 1 and 11 in which the Cr/O value and the Cr/Fe value measured by an Auger electron spectroscopy analysis at the surface of the passivation film 11 thus formed were not in the ranges described above, the silver plated layer formed on the passivation film 11 had poor plating properties or adhesiveness.

<Formation of Palladium Plated Layer>

Furthermore, among the Examples and Comparative Examples described above, the stainless steel sheets 10 of Examples 3 and 4 and Comparative Example 11 were subjected to an electroless plating treatment under the conditions of 60° C. and 40 seconds using an electroless palladium plating bath (manufactured by Okuno Chemical Industries Co., Ltd., product No.: PARATOP), and thereby a palladium plated layer having a thickness of about 10 nm was formed as a metal plated layer 20 on the passivation film 11 of each stainless steel sheet 10. Thus, metal plate coated stainless materials 100 (palladium) were obtained. For the metal plate coated stainless materials 100 (palladium) thus obtained, an evaluation of the plating properties and an evaluation of adhesiveness were conducted similarly to the case of the metal plate coated stainless materials 100 described above.

As a result, in the metal plate coated stainless material 100 (palladium) obtained from the stainless steel sheets 10 of Examples 3 and 4, Pd was detected from the surface, and it was confirmed that palladium plated layers were formed. On the other hand, in the metal plate coated stainless material 100 (palladium) obtained from the stainless steel sheet 10 of Comparative Example 11, Pd was not detected from the surface, and it was confirmed that the plating properties of the palladium plating layer were unsatisfactory.

Furthermore, for the metal plate coated stainless materials 100 (palladium) obtained from the stainless steel sheets 10 of Examples 3 and 4, an evaluation of adhesiveness of the palladium plated layers was carried out. Specifically, a peeling test was performed by adhering an adhesive tape (manufactured by Nichiban Co., Ltd., NICETACK powerful type) to the palladium plated layer of a metal plate coated stainless material 100 (palladium), and then detaching the adhesive tape. Thereafter, an observation of the detachment state of the palladium plated layer was made, and in a case in which detachment was not recognized, it was considered that the palladium plated layer had satisfactory adhesiveness. Thus, the evaluation of adhesiveness was carried out.

As a result, in the metal plate coated stainless materials 100 (palladium) obtained from the stainless steel sheets 10 of Examples 3 and 4, detachment of the palladium plated layer was not recognized, and it was confirmed that the palladium plated layer had satisfactory adhesiveness.

Thereby, from the results of Table 1, it was confirmed that in regard to Examples 3 and 4 in which a passivation film 11 having a Cr/O value in the range of 0.05 to 0.2 and a Cr/Fe value in the range of 0.5 to 0.8 at the surface as measured by an Auger electron spectroscopy analysis was formed on each of the stainless steel sheets 10, the palladium plated layer formed on the passivation film 11 had excellent plating properties and adhesiveness.

On the other hand, it was confirmed from the results of Table 2 that in Comparative Example 11 in which the Cr/O value and the Cr/Fe value measured by an Auger electron spectroscopy analysis at the surface of the passivation film 11 thus formed were not in the ranges described above, the palladium plated layer formed on the passivation film 11 had poor plating properties.

<Formation of Platinum Plated Layer>

Furthermore, among the Examples and Comparative Examples described above, for the stainless steel sheets 10 of Examples 3 and 4 and Comparative Example 1, a platinum plated layer was formed on the passivation film 11 of each of the stainless steel sheets 10, and the plating properties and adhesiveness of the platinum plated layer were evaluated. Specifically, the stainless steel sheets 10 of Examples 3 and 4 and Comparative Example 11 were subjected to an electroless plating treatment under the conditions of 55° C. and 3 minutes using an electroless platinum plating bath (manufactured by Japan Pure Chemical Co., Ltd., product No.: IM-Pt), and thereby a platinum plated layer having a thickness of about 20 nm was formed as a metal plated layer 20 on the passivation film 11 of each of the stainless steel sheets 10. Thus, meta plate coated stainless steel materials 100 (platinum) were obtained. Then, for the metal plate coated stainless materials 100 (platinum) thus obtained, an evaluation of the plating properties and an evaluation of the adhesiveness were carried out in the same manner as in the case of the metal plate coated stainless materials 100 (silver) and the metal plate coated stainless materials 100 (palladium) described above.

As a result, in the metal plate coated stainless materials 100 (platinum) obtained from the stainless steel sheets 10 of Examples 3 and 4, Pt was detected from the surface by an analysis using a fluorescent X-ray analyzer, and it was confirmed that a platinum plated layer was formed satisfactorily. On the other hand, in the metal plate coated stainless material 100 (platinum obtained from the stainless steel sheet 10 of Comparative Example 11, Pt was not detected from the surface, and it was confirmed that the plating properties of the platinum plated layer were unsatisfactory.

Furthermore, in the metal plate coated stainless materials 100 (platinum) obtained from the stainless steel sheets 10 of Examples 3 and 4, detachment of the platinum plated layer was not recognized in a peeling test using an adhesive tape, and it was confirmed that the platinum plated layers had satisfactory adhesiveness. Meanwhile, in regard to the stainless steel sheet 10 of Comparative Example 11, since it was confirmed that the plating properties of the platinum plated layer were unsatisfactory, an evaluation of the adhesiveness of the platinum plated layer was not conducted.

Thereby, it was confirmed from the results of Table 1 that in regard to Examples 3 and 4 in which a passivation film 11 having a Cr/O value in the range of 0.05 to 0.5 and a Cr/Fe value in the range of 0.5 to 0.8 at the surface as measured by an Auger electron spectroscopy analysis was formed on each of the stainless steel sheets 10, the platinum plated layer formed on the passivation film 11 had excellent plating properties and adhesiveness.

On the other hand, it was confirmed from the results of Table 2 that in Comparative Example 11 in which the Cr/O value and the Cr/Fe value measured by an Auger electron spectroscopy analysis at the surface of the passivation film 11 thus formed were not in the ranges described above, the platinum plated layer formed on the passivation film 11 had poor plating properties.

<Evaluation by Formation of Gold Plated Layer>

Furthermore, for Examples 1 to 8 and Comparative Examples 1 to 11, a gold plated layer was formed on the passivation film 11 of each of the stainless steel sheets 10, and the plating properties and adhesiveness of the gold plated layers were evaluated. Specifically, the stainless steel sheets 10 of Examples 1 to 8 and Comparative Examples 1 to 11 were subjected to an electroless plating treatment under the conditions of 70° C. and 5 minutes using an electroless gold plating bath (manufactured by Okuno Chemical Industries Co., Ltd., product No.: FLASH GOLD NF), and thereby a gold plated layer having a thickness of about 23 nm was formed on the passivation film 11. Thus, gold plate coated stainless steel materials were obtained. For the gold plate coated stainless steel materials thus obtained, an evaluation of the plating properties and an evaluation of adhesiveness were conducted similarly to the cases of the metal plate coated stainless material (100), the metal plate coated stainless material (palladium), and the metal plate coated stainless material (platinum) described above.

As a result, in the gold plate coated stainless steel materials obtained from the stainless steel sheets 10 of Examples 1 to 8 and Comparative Examples 1 to 3, Au was detected from the surface by an analysis using a fluorescent X-ray analyzer, and it was confirmed that gold plated layers were formed satisfactorily. On the other hand, in the gold plate coated stainless steel materials obtained from the stainless steel sheets 10 of Comparative Examples 4 to 11, Au was not detected from the surface, and it was confirmed that the plating properties of the gold plated layer were unsatisfactory.

Furthermore, for the gold plate coated stainless materials obtained from the stainless steel sheets 10 of Examples 1 to 8, detachment of the gold plated layers was not recognized in a peeling test using an adhesive, and it was confirmed that the gold plated layers had satisfactory adhesiveness. On the other hand, in regard to the gold plate coated stainless steel materials obtained from the stainless steel sheets 10 of Comparative Examples 1 to 3, a portion or the entire surface of each gold plated layer was detached due to the peeling test, and it was confirmed that the gold plated layers had insufficient adhesiveness. Meanwhile, in regard to the stainless steel sheets 10 of Comparative Examples 4 to 11, it was confirmed that the plating properties of the gold plated layers were unsatisfactory as described above. Thus, an evaluation of the adhesiveness of the gold plated layers was not conducted.

Thereby, in regard to Examples 1 to 8 in which a passivation film 11 having a Cr/O value in the range of 0.05 to 0.2 and a Cr/Fe value in the range of 0.5 to 0.8 at the surface as measured by an Auger electron spectroscopy analysis was formed on each of the stainless steel sheets 10, it was confirmed that the gold plated layers formed on the passivation films 11 had excellent plating properties and adhesiveness.

On the other hand, it was confirmed from the results of Tables 1 and 2 that in regard to Comparative Examples 1 to 11 in which the Cr/O value and the Cr/Fe value measured by an Auger electron spectroscopy analysis at the surface of the passivation films 11 thus formed were not in the ranges described above, the gold plated layers formed on the passivation films 11 had poor plating properties and adhesiveness.

Meanwhile, as illustrated in Table 1 and FIG. 3, in Examples 1 to 8 in which the concentration, temperature and immersion time employed at the time of immersing stainless steel materials in an aqueous solution of sulfuric acid were regulated so as to satisfy the relationship of Expression (1) described above, it was confirmed that the Cr/O value and the Cr/Fe value measured by an Auger electron spectroscopy analysis at the surface of the passivation films thus formed were controlled to the ranges described above. On the other hand, as illustrated in Tables 1 and 2 and FIG. 3, in Comparative Examples 1 to 5 in which the concentration, temperature and immersion time employed at the time of immersing stainless steel materials in an aqueous solution of sulfuric acid did not satisfy the relationship of Expression (1) described above; in Comparative Examples 6 to 10 in which stainless steel materials were immersed in a solution other than an aqueous solution of sulfuric acid; and in Comparative Example 11 in which immersion was omitted, it was confirmed that the Cr/O value and the Cr/Fe value measured by an Auger electron spectroscopy analysis at the surface of the passivation films 11 thus formed were not in the ranges described above.

Furthermore, FIG. 5 is a diffraction profile illustrating the results of performing an XRD analysis of Example 3 and a stainless steel material (SUS316L) that was not immersed in an aqueous solution of sulfuric acid, using an X-ray analytical instrumentation. Meanwhile, in FIG. 5, the horizontal axis represents the diffraction angle, and the vertical axis represents the diffraction intensity. Each peak of the diffraction profile illustrated in FIG. 5 is, as illustrated in the diagram, a resultant of synthesis of peaks originating from the crystal planes of Cr0.4Ni0.6, (1. 1. 1), (2. 0. 0) and (2. 2. 0); the crystal planes of CrOxide, (1. 1. 1), (2. 0. 0) and (2. 2. 1); and the crystal planes of FeCrNiC, (4. 2. 0), (2. 0. 2), (4. 2. 1) and (4. 0. 2). From the results of FIG. 5, in Example 3 in which the stainless steel material was immersed in an aqueous solution of sulfuric acid, the peak at the diffraction angle of near 66° originating from the crystal plane (2. 2. 0) of CrOxide and the peak at the diffraction of near 75° originating from the crystal plane (2. 2. 0) of Cr0.4Ni0.6 became smaller compared to the peaks of SUS316L that was not immersed in an aqueous solution of sulfuric acid. Therefore, it was confirmed that the content proportions of CrOxide and Cr0.4Ni0.6 in the stainless steel sheet 10 had been decreased. Thereby, in Example 3, it is considered that the Cr strength at the surface of the passivation film 11 formed on the stainless steel sheet 10 was decreased by the immersion in an aqueous solution of sulfuric acid. As a result, it is considered that the Cr/O value and the Cr/Fe value obtained by an Auger electron spectroscopy analysis at the surface of the passivation film 11 were decreased and were controlled to the ranges described above.

Furthermore, as illustrated in FIG. 2, in Example 2 in which the concentration, temperature and immersion time employed at the time of immersing the stainless steel material in an aqueous solution of sulfuric acid were regulated so as to satisfy the relationship of Expression (1) described above, the peak of Fe(metal) at near 707 eV became larger compared to SUS316L (untreated) that was not immersed in an aqueous solution of sulfuric acid as can be seen from the graph of FIG. 2(A). Thereby, it could be confirmed that active elemental iron (Fe(metal)) at was exposed at the surface of the passivation film 11 thus formed.

Furthermore, as illustrated in FIG. 4, in Examples 1 to 4 in which the concentration, temperature and immersion time employed at the time of immersing the stainless steel materials in an aqueous solution of sulfuric acid were regulated so as to satisfy the relationship of Expression (1) described above, the values of arithmetic mean roughness Ra became larger compared to those obtained before immersion in an aqueous solution of sulfuric acid (immersion time 0 seconds). Thereby, it was confirmed that superior plating properties and adhesiveness of the metal plated layers 20 formed on the passivation films 11 were obtained.

Furthermore, as illustrated in FIGS. 6 and 7, in Example 2 in which the concentration, temperature and immersion time employed at the time of immersing the stainless steel material in an aqueous solution of sulfuric acid were regulated so as to satisfy the relationship of Expression (1) described above, it was confirmed that the crystal structure at the surface of the stainless steel sheet 10 had changed compared to SUS316L (untreated).

Specifically, according to the results of FIG. 6(A) and FIG. 6(C), the shape of the surface of the stainless steel sheet 10 became rough due to the aqueous solution of sulfuric acid in Example 2, compared to SUS316L (untreated). In addition, in Example 2, a diffraction pattern originating from a crystal containing a relatively large amount of elemental iron was measured as illustrated in FIG. 7(A), and on the other hand, in the case of SUS316L (untreated), a diffraction pattern originating from a crystal of chromium oxide was measured as illustrated in FIG. 7(C). Thereby, in Example 2, it was confirmed that the crystal structure at the surface of the stainless steel sheet 10 had changed as compared to SUS316L (untreated), and crystals containing a relatively large amount of elemental iron were exposed.

On the other hand, as illustrated in FIG. 3, in Comparative Example 11 in which the stainless steel material was not immersed in an aqueous solution of sulfuric acid, since the content proportion of Cr in the oxide film that had been originally formed on the surface of the stainless steel material was large as described above, the Cr/O value and the Cr/Fe value became too high. Also, in Comparative Examples 1 and 2 in which the concentration, temperature and immersion time employed at the time of immersing the stainless steel material in an aqueous solution of sulfuric acid did not satisfy the relationship of Expression (1) described above, the oxide film was completely (or almost completely) removed from the surface of the stainless steel material, as described above. Thus, after the passivation film 11 was formed on the stainless steel sheet, the stainless steel sheet was corroded by the aqueous solution of sulfuric acid, and thereby iron preferentially liquated, while the amount of Cr became relatively larger. Thus, the Cr/O value and the Cr/Fe value became too high.

Furthermore, as illustrated in FIG. 2(A), in Comparative Example 2 in which the concentration, temperature and immersion time employed at the time of immersing the stainless steel material in an aqueous solution of sulfuric acid did not satisfy the relationship of Expression (1) described above, the peak of Fe(metal) at near 707 eV became small compared to Example 2. Thereby, it was confirmed that the proportion of active elemental iron (Fe (metal)) at the surface of the passivation film 11 thus formed had decreased.

Furthermore, as illustrated in FIG. 2(B), in Comparative Example 2, the peaks originating from nickel oxide (Ni—O) at near 874 eV and 856 eV became small compared to Example 2. Thereby, it was confirmed that the proportion of nickel oxide having very brittle properties at the surface of the passivation film 11 thus formed had increased.

Furthermore, as illustrated in FIG. 6(B), in Comparative Example 2 in which the concentration, temperature and immersion time employed at the time of immersing the stainless steel material in an aqueous solution of sulfuric acid did not satisfy the relationship of Expression (1) described above, it was confirmed that the surface of the stainless steel sheet 10 was corroded in the form of formicary, and the surface was structurally embrittled. In addition, in Comparative Example 2, as illustrated in FIG. 7(B), a diffraction pattern originating from a crystal containing a relatively large amount of nickel oxide was measured. Thus, it was confirmed that the crystal structure at the surface of the stainless steel sheet 10 had changed, and the proportion of nickel oxide having very brittle properties had increased.

Furthermore, in Example 3, the metal plate coated stainless material 100 (silver), the metal plate coated stainless material 100 (palladium), and the metal plate coated stainless material 100 (platinum) described above were each obtained by forming a silver plated layer, a palladium plated layer or a platinum plated layer as the metal plated layer 20 on the passivation film 11 of a stainless steel sheet 10. Also, the surfaces of the metal plate coated stainless material 100 (silver), the metal plate coated stainless material 100 (palladium) and the metal plate coated stainless material 100 (platinum) thus obtained were respectively analyzed by scanning electron microscopy SEM (manufactured by Hitachi High-Technologies Corp., S-4800) to obtain SEM photographs. The results are presented in FIG. 8.

Figure 8A:
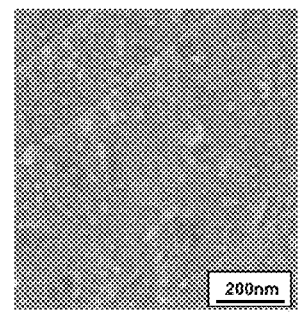
FIG. 8 is a set of SEM photographs of the surface of a metal plate coated stainless material 100 obtained in an Example.
Figure 8B:
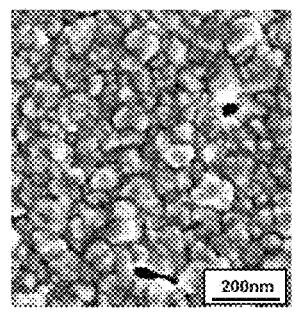
Figure 8C:
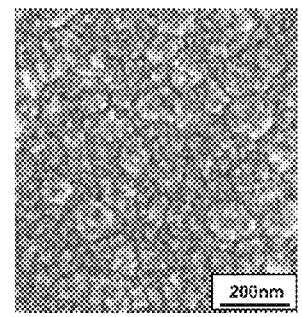
Figure 8D:
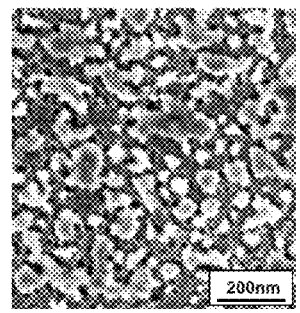

Meanwhile, in regard to FIG. 8, FIG. 8(A) is a SEM photograph obtained before the metal plated layer 20 was formed, and FIG. 8(B) is a SEM photograph of the metal plate coated stainless material 100 (silver) obtained by forming a silver plated layer as the metal plated layer 20. FIG. 8(C) is a SEM photograph of the metal plate coated stainless material 100 (palladium) obtained by forming a palladium plated layer as the metal plated layer 20, and FIG. 8(D) is SEM photograph of the metal plate coated stainless material 100 (platinum) obtained by forming a platinum plated layer as the metal plated layer 20.

From the results of Table 1 and FIG. 8, in Example 3 in which a passivation film 11 having a Cr/O value in the range of 0.05 to 0.2 and a Cr/Fe value in the range of 0.5 to 0.8 at the surface as measured by an Auger electron spectroscopy analysis was formed on a stainless steel sheet 10, it was confirmed that the silver plated layer, the palladium plated layer and the platinum plated layer formed as the metal plated layer 20 on the passivation film 11 were formed satisfactorily.

Furthermore, for the metal plate coated stainless material 100 (platinum) in Example 4, the contact resistance value was measured according to the method described above. The results are presented in FIG. 10.

Figure 10:
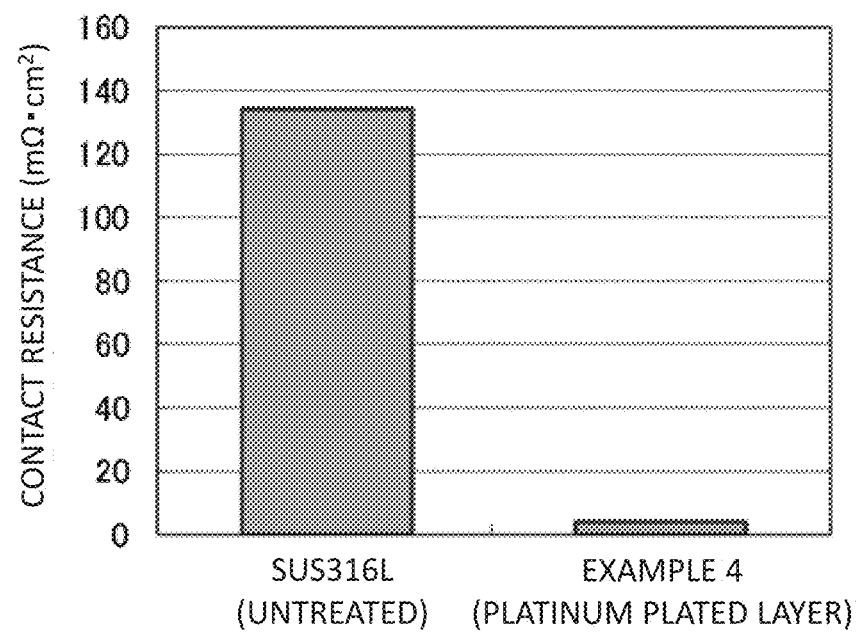
FIG. 10 is a graph illustrating the results of measuring the contact resistance of a metal plate coated stainless material 100 obtained in an Example.

From the results of FIG. 10, in Example 4 in which a passivation film 11 having a Cr/0 value in the range of 0.05 to 0.2 and a Cr/Fe value in the range of 0.5 to 0.8 at the surface by an Auger electron spectroscopy analysis was formed on a stainless steel sheet 10, the metal plate coated stainless material 100 (platinum) obtained by forming a platinum plated layer as the metal plated layer 20 on the passivation film 11 had a low value of contact resistance compared to SUS316L that is used as a material of a conventional separator for a fuel cell or the like. Consequently, the metal plate coated stainless material 100 (platinum) had excellent electrical conductivity.

Thus, examples of forming a silver plated layer, a palladium plated layer and a platinum plated layer as the metal plated layers 20 on the passivation film 11 of stainless steel sheets 10 have been illustrated in the Examples. However, according to the invention, regarding the metal that constitutes the metal plated layer 20, rhodium (Rh), ruthenium (Ru), copper (Cu), tin (Sn) and chromium (Cr) described above can be used in addition to these silver (Ag), palladium (Pd) and platinum (Pt).

In addition, the metal plated layer 20 formed from Ag, Pd or Pt has excellent plating properties and excellent adhesiveness as described above; however, this is due to the fact that Ag, Pd and Pt are noble metals having high standard electrode potentials. That is, since Ag, P and Pt are noble metals, these metals readily precipitate out on the passivation film 11 of the stainless steel sheet 10 as a result of electroless plating, and the metal plated layer 20 thus obtainable has a high coverage. Consequently, the metal plated layer 20 has excellent plating properties and adhesiveness. Furthermore, since Ag, Pd and Pt are noble metals, these metals are also excellent from the viewpoint that the contact resistance over time does not easily deteriorate. Also, a metal plated layer 20 formed from Ag, Pd or Pt also has excellent electrical conductivity as described above; however, this is due to the low contact resistance of Ag, Pd and Pt.

Here, all of the above-described metals Rh, Ru, Cu, Sn and Cr are also noble metals having high standard electrode potentials similarly to Ag, Pd and Pt, and have the property of low contact resistance. Accordingly, even in a case in which a rhodium plated layer, a ruthenium plated layer, a copper plated layer, a tin plated layer or a chromium plated layer is formed as the metal plated layer 20 on the passivation film 11 of a stainless steel sheet 10, it is considered that the metal plated layer 20 thus obtainable has excellent plating properties, adhesiveness and electrical conductivity, similarly to the metal plated layer 20 formed from Ag, Pd or Pt described above.

On the contrary, metals other than Ag, Pd, Pt, Rh, Ru, Cu, Sn and Cr mentioned above are less noble metals having relatively lower standard electrode potentials. Therefore, it is considered that the metals do not easily precipitate on the passivation film 11 of a stainless steel sheet 10 by electroless plating, and metal plated layers 20 thus obtainable have inferior plating properties and adhesiveness.

What is claimed is:

1. A metal plate coated stainless material comprising:
a stainless steel sheet coated with a metal plated layer which is deposited on a passivation film present on the surface of the stainless steel sheet, wherein
the passivation film has a surface composition having a Cr/0 value comprised within a range from 0.05 to 0.2 and a Cr/Fe value comprised within a range from 0.5 to 0.8, the Cr/0 value and the Cr/Fe value obtained by Auger electron spectroscopy analysis, and
the metal plated layer is formed from any one metal selected from among Ag, Pd, Pt, Rh, Ru, Cu, Sn and Cr, or an alloy composed of at least two or more metals selected from among these metals.

2. The metal plate coated stainless material according to claim 1, wherein the metal plated layer has a coverage of 95% or more with respect to the passivation film.

3. The metal plate coated stainless material according to claim 1, wherein the metal plated layer essentially consists of one or more metal selected from a group consisting of Ag, Pd, Pt, Rh, Ru, Cu, Sn and Cr.

4. The metal plate coated stainless material according to claim 1, wherein the ratio (Fe (metal)/Fe (total)) of an elementary substance of iron (Fe (metal) to the total amount of Fe atoms (Fe (total)) at the surface of the passivation film is 14% or more.

5. The metal plate coated stainless material according to claim 1, wherein the ratio (Ni (metal)/Ni (total)) of an elementary substance of nickel (Ni (metal) to the total amount of Ni atoms (Ni (total)) at the surface of the passivation film is 18% or more.

6. The metal plate coated stainless material according to claim 1, wherein an arithmetic average roughness Ra of the passivation film is 0.015 μm to 0.036 μm.

7. The metal plate coated stainless material according to claim 1, wherein the thickness of the metal plated layer is within 2 to 20 nm.

\* \* \* \* \*